United States Patent [19]
Therkildsen

[11] 3,915,433
[45] Oct. 28, 1975

[54] DISCONNECT CLUTCH ASSEMBLY FOR WINCH DRUM

[75] Inventor: Henry T. Therkildsen, East Peoria, Ill.

[73] Assignee: Caterpillar Tractor Co., Peoria, Ill.

[22] Filed: Oct. 10, 1974

[21] Appl. No.: 513,866

[52] U.S. Cl. .......... 254/187 R; 192/85 A; 192/91 A; 254/150 R
[51] Int. Cl.² .......................................... B66D 1/24
[58] Field of Search ............ 254/187 R, 166, 150 R; 192/91 A, 85 A, 12 A

[56] References Cited
UNITED STATES PATENTS

| | | | |
|---|---|---|---|
| 1,938,780 | 12/1933 | Nenninger | 192/91 A |
| 2,639,795 | 5/1953 | Munschauer | 192/85 A |
| 3,325,149 | 6/1967 | Woodward | 254/187 R |
| 3,697,049 | 10/1972 | Wallace | 192/91 A |
| 3,729,171 | 4/1973 | Yates | 192/12 A |

*Primary Examiner*—Robert R. Song
*Attorney, Agent, or Firm*—Phillips, Moore, Weissenberger, Lempio & Strabala

[57] ABSTRACT

Improvements in a winch assembly having a power input coupled to a drive shaft by a plurality of clutches, a disconnect clutch providing a selective coupling between the shaft and a cable drum, the disconnect clutch including one jaw gear rotatably mounted upon the shaft and operatively coupled in driving relation with the cable drum, a second jaw gear mounted in splined relation upon the shaft for axial movement thereon, a hydraulically responsive piston within the shaft controlling engagement between the two clutch gears. According to the present invention the first jaw gear is axially movable on the shaft and has teeth tending to maintain engagement with the second jaw gear, a brake unit internally contained within the shaft resisting axial movement of the first jaw gear upon actuation of the disconnect clutch while also tending to limit freewheeling operation of the cable drum.

5 Claims, 6 Drawing Figures

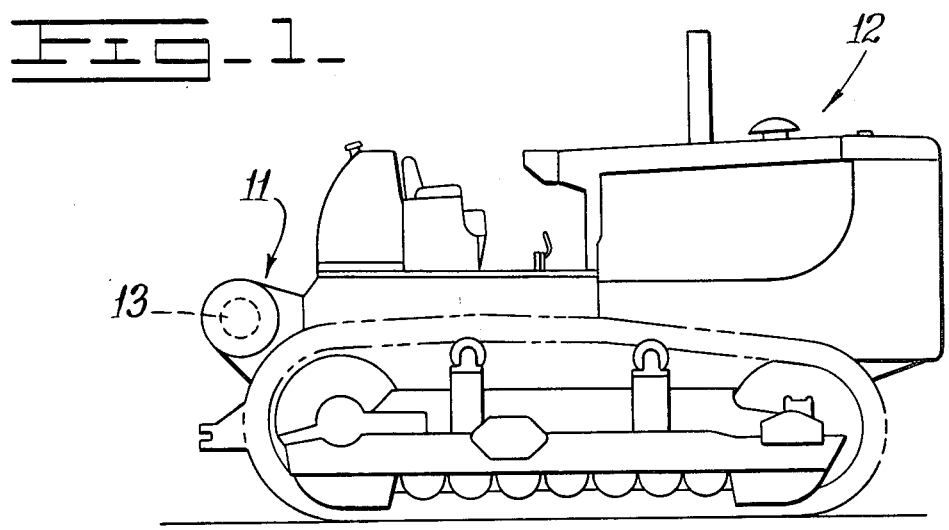
Fig-1-
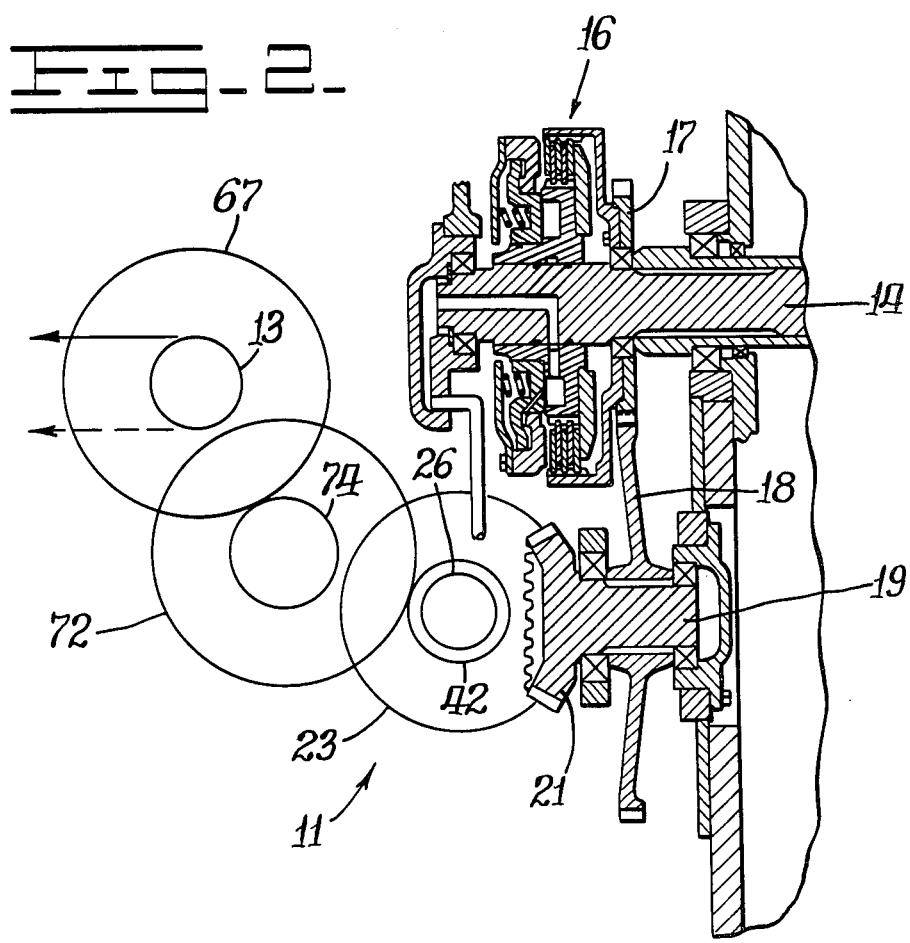
Fig-2-

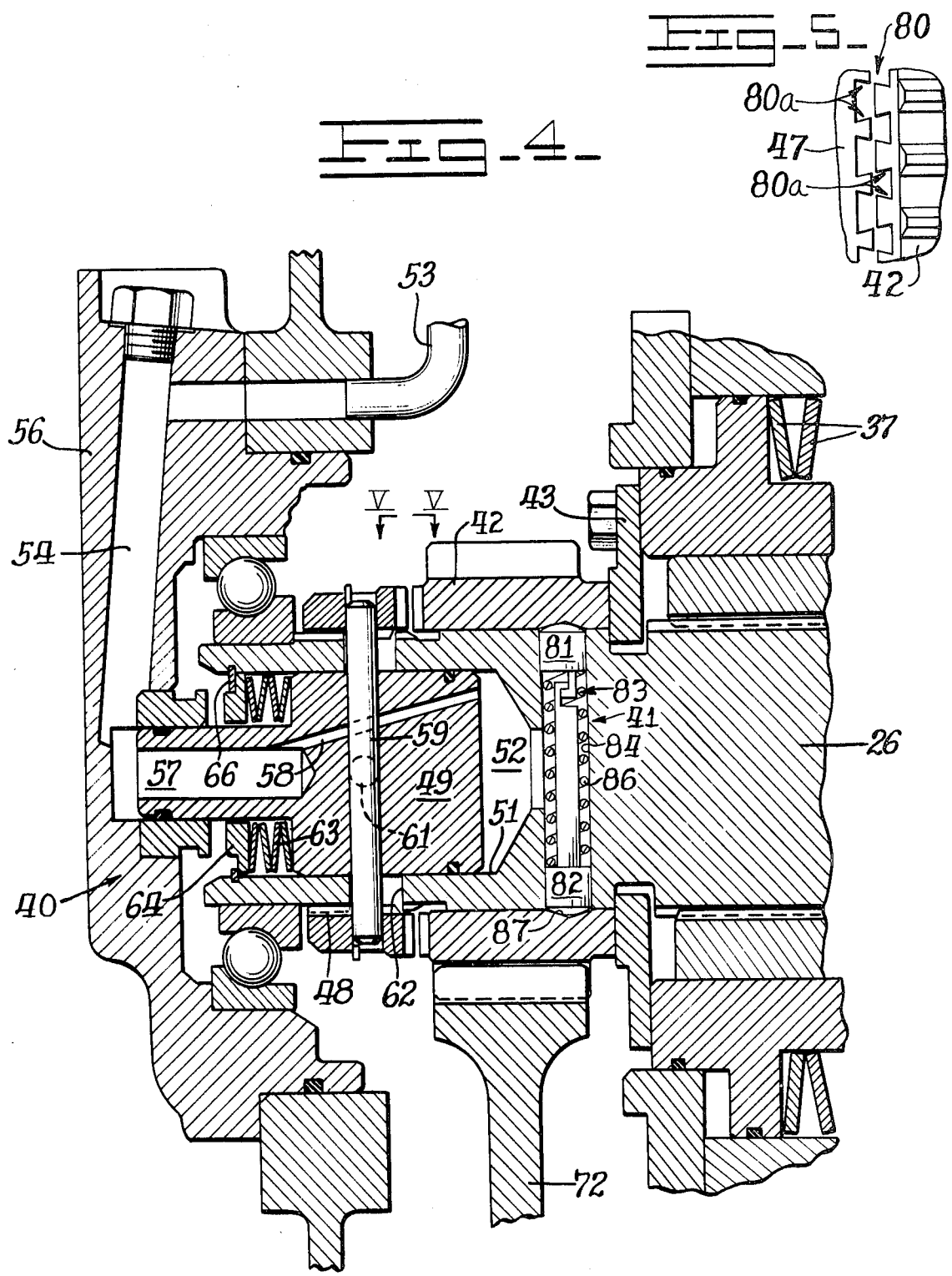

3,915,433

DISCONNECT CLUTCH ASSEMBLY FOR WINCH DRUM

BACKGROUND OF THE INVENTION

The present invention relates to improvements in a winch assembly of the type disclosed in a co-pending United States Patent application, Ser. No. 364,902 filed May 29, 1973, now U.S. Pat. No. 3,848,852 assigned to the assignee of the present invention. The winch assembly includes a plurality of clutches within an intermediate power train for selectively regulating operation of a cable drum. In addition, the present invention is particularly directed toward improvements in a disconnect clutch and associated brake in order to provide a selective coupling between the power train and the cable drum while also permitting regulated "freewheeling" rotation of the winch drum.

Within a winch assembly of this type, it is desirable to selectively uncouple the cable drum from the power train, for example, to permit manual unreeling of cable from the drum. It is additionally necessary to assure that the disconnect clutch properly maintains the cable drum in coupled or uncoupled relation with the power train. Further, it has been found that the cable drum may continue in rotation even when the cable is not being drawn from the drum. Accordingly, unlimited "free-wheeling" of the drum may result in undesirable unreeling of the cable, causing it to become snarled or tangled.

SUMMARY OF THE PRESENT INVENTION

Accordingly, it is an object of the present invention to provide improvements within a winch unit for overcoming one or more problems of the type outlined above.

More particularly, it is an object of the invention to provide a disconnect clutch assembly for assuring proper engagement or disengagement between a pair of jaw gears which are employed to selectively couple a power train with a cable drum.

It is also a particular object of the present invention to provide a brake means internally arranged within an elongated shaft together with at least a portion of a disconnect clutch, the brake being actuated along with the disconnect clutch for limiting freewheeling rotation of the cable drum.

Additional objects and advantages of the present invention are made apparent in the following description having reference to the accompanying drawings.

DESCRIPTION OF THE DRAWINGS

FIG. 1 is a side elevation view of a track-type tractor including a towing winch assembly constructed according to the present invention.

FIGS. 2 and 3 are sectioned views illustrating in greater detail the power train of the winch assembly.

FIG. 4 is an enlarged fragmentary view, with parts in section, illustrating an improved disconnect clutch assembly of the present invention.

FIG. 5 is a further enlarged fragmentary view of interacting teeth for a pair of jaw gears within the disconnect clutch assembly of FIG. 4.

DESCRIPTION OF THE PREFERRED EMBODIMENTS

Figure 3:
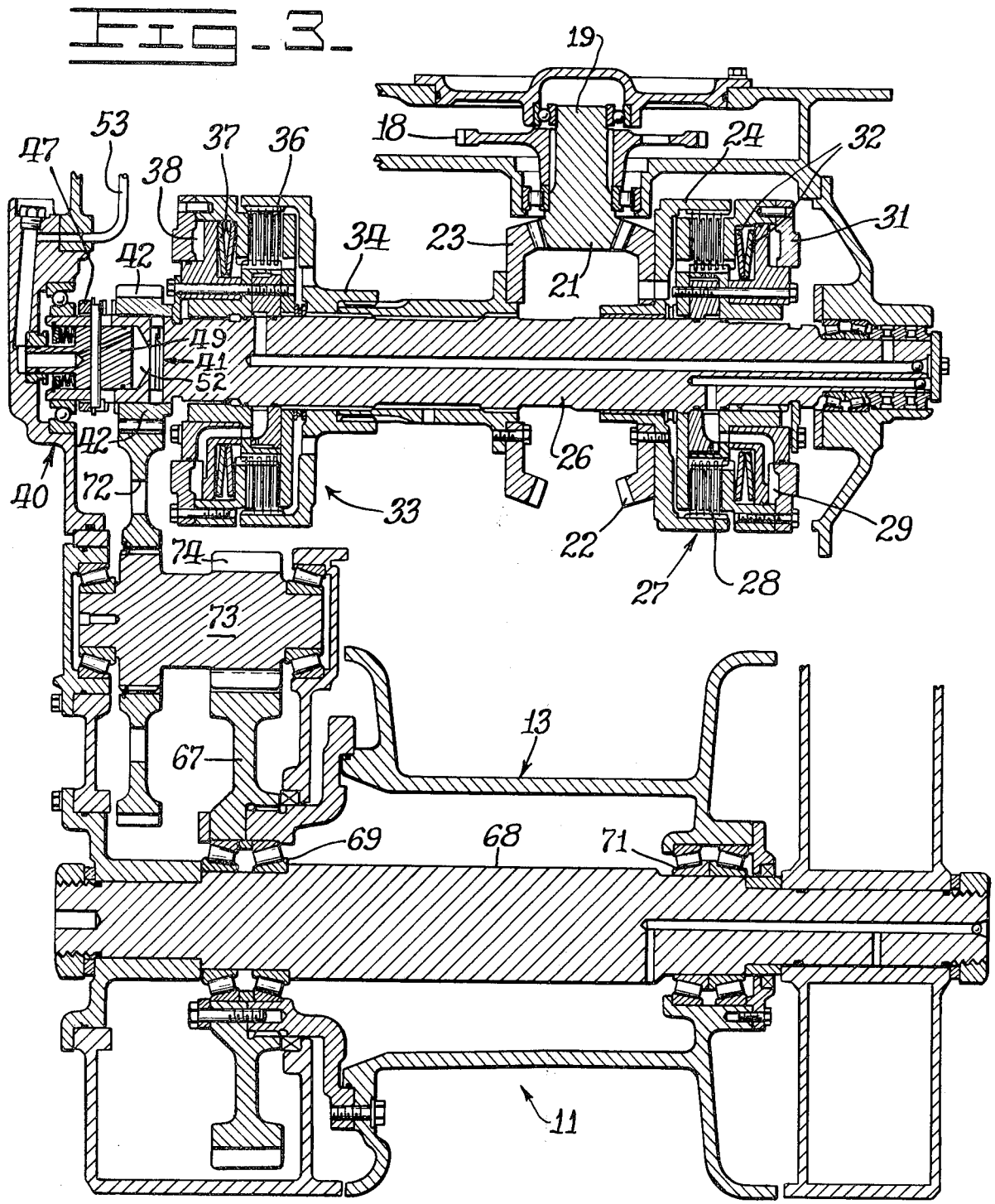

Referring to the drawings and particularly to FIG. 1, a towing winch assembly 11 is mounted upon a track-type tractor 12 and includes a rotatable cable drum 13. The cable drum 13 is operated by a power train for the winch assembly as described in greater detail below to provide for conventional reeling-in and reeling-out of a cable trained about the cable drum 13.

Referring now to FIGS. 2 and 3, a power train for the winch assembly includes a power input shaft 14 which is preferably a conventional power take-off for a prime mover or internal combustion engine of the tractor 12.

A normally disengaged input clutch 16 is actuated to selectively couple the input shaft 14 with a gear 17. The gear 17 meshes with a gear 18 which in turn is splined to a rotatable input shaft 19. One end of the input shaft 19 is secured to a first bevel gear 21 which meshes with opposed second and third bevel gears 22 and 23. The bevel gear 22 is secured to a carrier 24 being rotatably mounted on an elongated shaft 26.

The carrier and shaft are selectively coupled by means of a normally engaged winch clutch 27 comprising interleaved friction discs 28 which are alternately mounted for axial movement on the carrier and shaft by means of conventional splined connections. The friction discs are disengaged by fluid pressurization of a clutch member 29 which causes an annular piston assembly 31 to move rightwardly as viewed, for example, in FIG. 3. The discs are normally compressed together by means of a Belleville type spring assembly 32 in order to engage the clutch.

The bevel gear 23 is similarly coupled with a second winch clutch 33 which comprises a carrier 34, rotatably mounted on the common shaft 26 and coupled to the gear 23. Interleaved clutch discs 36 are alternately splined on the carrier and shaft. Similar Belleville type springs 37 normally engage the clutch 33 while fluid pressurization of an actuating chamber 38 tends to compress the springs 37 and thus permit disengagement of the clutch 33. With both of the clutches 27 and 33 engaged, the shaft 26 is locked against rotation.

The elongated shaft 26 is selectively uncoupled from the cable drum 13 by means of a disconnect assembly including a disconnect clutch indicated at 40 and an associated brake unit indicated at 41. The clutch 40, which is described in greater detail below, is normally engaged so that the cable drum 13 is coupled for rotation with the shaft 26. Thus, when only the second winch clutch 33 is disengaged, the bevel gear 22 rotates the carrier 24 and causes rotation of the shaft 26.

Conversely, when only the first winch clutch 27 is disengaged, the bevel gear 23 imparts rotation of the carrier 34 and the shaft 26 in an opposite direction of rotation. The clutches 27 and 33 thus tend to provide for powered operation of the shaft 26 and the cable drum 13 in either "reeling-in" or "reeling-out" modes of operation.

The clutch 40 may be selectively disengaged to permit freewheeling rotation of the cable drum 13, substantially free from "drag" caused by the shaft 26 or other components associated for rotation therewith. The clutch 40 and brake unit 41 are described in greater detail below.

The disconnect clutch 40 includes a first clutch member or jaw gear 42 which is arranged for rotation on the shaft 26. Axial movement of the jaw gear 42 in a rightward direction, as viewed in FIG. 4, is limited by a thrust plate 43, while being further configured according to the present invention for positively assuring selective engagement or disengagement with a second clutch member or jaw gear 47, as described below.

The jaw gear 47 is coupled for rotation with the shaft 26 by means of splines indicated at 48. The splined mounting of the jaw gear 47 permits it to move into and out of meshing engagement with the first jaw gear 42 under the influence of a piston 49 which is axially arranged within an internal bore 51 in the shaft 26. An actuating chamber 52 is formed in the right end of the bore 51 by the piston 49. Hydraulic fluid for actuating the piston 49 is introduced into the chamber 52 by means of passages 53 and 54 formed in a housing portion 56 of the winch assembly. The passage 54 is in communication with the chamber 52 by means of passages 57 and 58 internally formed within the piston 49.

The piston 49 is secured to the second jaw gear 47 by means of pins 59 and 61 which extend through axially elongated slots 62 in the shaft 26. Thus, fluid pressure in the chamber 52 tends to shift the piston 49 and the jaw gear 47 in a leftward direction as viewed in FIG. 4. Leftward movement of the piston 49 compresses the spring 63 to selectively disengage the jaw gear 47 from the other jaw gear 42. When fluid pressure is relieved from the chamber 52, the springs 63 again urge the piston 49 rightwardly to re-engage the jaw gears.

The jaw gear 42 may be coupled either directly or indirectly with the cable drum 13. Preferably, the cable drum 13 is secured to a gear 67 and mounted for rotation upon a shaft 68 by means of bearings 69 and 71. The jaw gear 42 meshes with a gear 72 mounted upon an intermediate shaft 73 along with another gear 74 which meshes with the cable drum drive gear 67.

Controls for operating the opposed clutches 27 and 33 as well as the disconnect clutch 40 are not a feature of the present invention and have accordingly been omitted from the drawings. However, as noted above, the clutches 27 and 33 may be actuated independently or together in a manner disclosed, for example, in U.S. Pat. application Ser. No. 151,367, filed June 9 1971, now U.S. Pat. No. 3,729,171, assigned to the assignee of the present invention.

The first jaw gear 42 is axially movable upon the shaft 26 in order to permit it to remain properly engaged with the other jaw gear 47. To further insure continued engagement between the jaw gears 42 and 47, their teeth 80 (as best seen in FIG. 5) are formed with negative or overlapping pressure angles, indicated at 80a, while being sufficiently spaced apart to permit selective engagement or disengagement between the teeth.

The brake unit 41 normally tends to maintain the jaw gear 42 in its rightward position against the plate 43 while permitting it to axially follow the other jaw gear 47 under the influence of their interlocking teeth 80 in order to assure proper engagement of the clutch 40. Thus, the brake unit 41 normally applies only a light force for maintaining the jaw gear 42 in its rightwardly shifted position.

The brake unit 41 comprises a pair of opposed detent pins 81 and 82 having interconnecting tangs indicated at 83. The detent pins 81 and 82 are arranged within a bore 84 extending diametrically across the shaft 26 in communication with the actuating chamber 52 for the disconnect clutch 40. The detent pins 81 and 82 are urged apart by a spring 86 into an annular groove 87 internally formed on the jaw gear 42. Through this arrangement, the brake unit 41 tends to maintain the jaw gear 42 in its rightwardly shifted position under a light force caused by the spring 86. However, the jaw gear 42 may move axially in order to assure continued engagement with the other jaw gear 47.

The brake unit 41 serves an additional function in conjunction with actuation of the disconnect clutch 40. Actuating pressure in the chamber 52 which shifts the piston 49 leftwardly to initiate disconnection between the jaw gears 47 and 42 also increases the force with which the detent pins 81 and 82 act radially outwardly against the jaw gear 42. This increased force maintains the jaw gear 42 in its rightward position while the other jaw gear 47 is shifted leftwardly to assure proper disengagement of the disconnect clutch. The brake unit 41 thus also applies increased force for selectively limiting rotation of the cable drum during freewheeling operation. Thus, the brake unit 41 additionally serves to prevent snarling or tangling of the cable as noted above.

Figure 6:
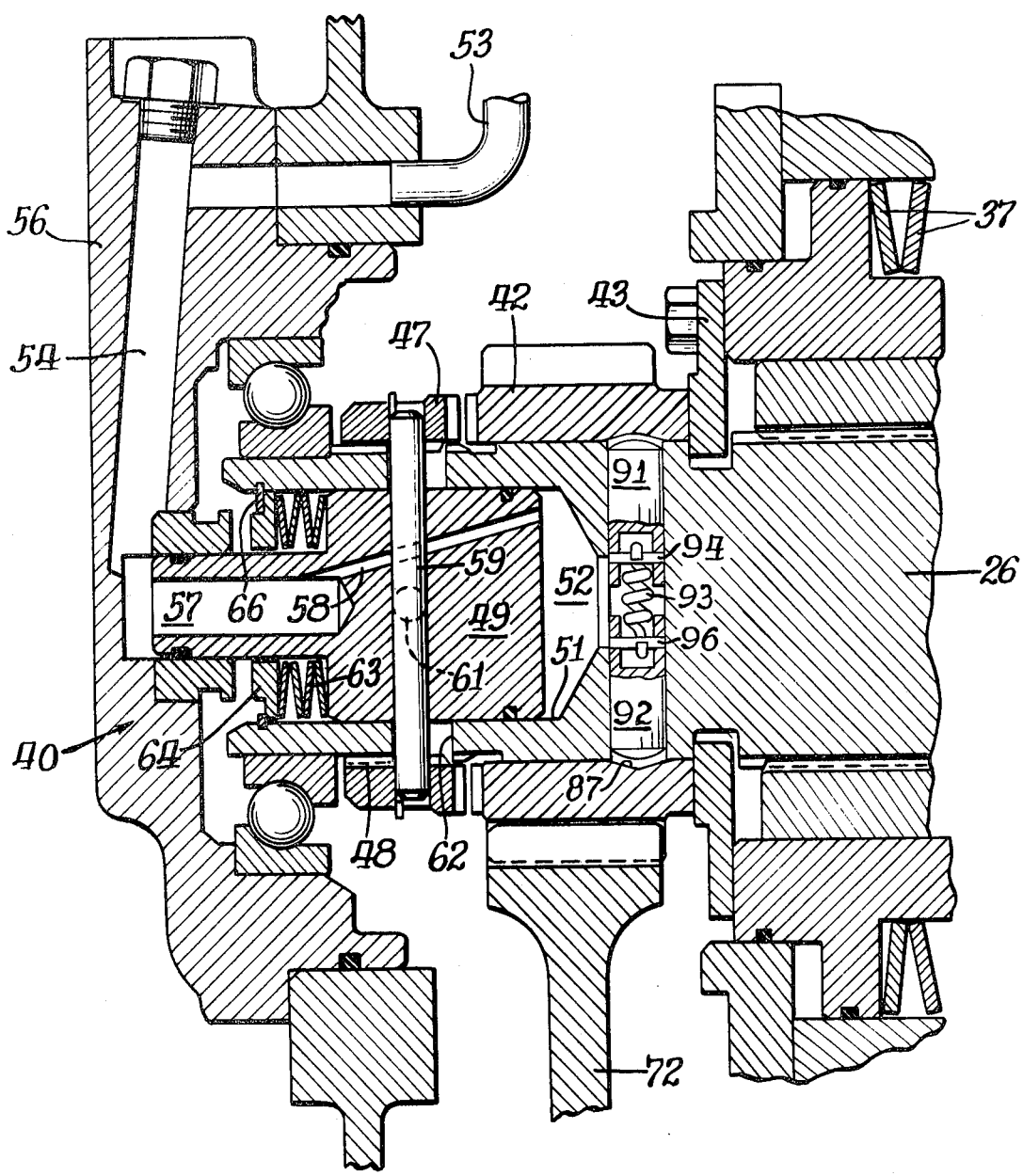
FIG. 6 is an enlarged fragmentary view, similar to FIG. 4, disclosing another embodiment of the disconnect clutch assembly.

FIG. 6 illustrates an alternate construction for the brake unit 41. The other components illustrated in FIG. 6 are substantially similar as those described above with relation to FIG. 4. Accordingly, the common elements in FIGS. 4 and 6 are indicated by the same numerical labels.

In some applications, it is desirable that the jaw gear 42 not be restrained from axial movement during selective engagement with the jaw gear 47. Accordingly, within the embodiment of FIG. 6, similar detent pins 91 and 92 are arranged within the bore 84 but are normally urged inwardly by means of an interconnecting spring 93. The spring 93 is connected with each of the detent pins 91 and 92 by means of respective retaining pins 94 and 96.

Thus, within the embodiment of FIG. 6, the detent pins 91 and 92 tend to remain out of engagement with the detent groove 87 during engagement of the jaw gears 42 and 47. However, then the piston 49 is again shifted leftwardly to initiate disconnection of the gears 42 and 47, increased pressure within the actuating chamber 52 urges the detent pins 91 and 92 outwardly so that they engage the groove 87 to prevent leftward movement of the jaw gear 42 and permit uncoupling of the other jaw gear 47.

Either set of detent pins 81, 82 or 91, 92 may, of course, be constructed from a suitable friction material to provide increased durability and resistance to rotation of the jaw gear 42 and cable drum 13.

I claim:

1. In a winch of the type having a rotatable cable drum and including a power input means, an elongated drive shaft, a clutch means providing a selective coupling between the power input means and the drive shaft, a first jaw gear rotatably mounted upon the drive shaft and operatively coupled in driving relation with the rotatable cable drum, a second jaw gear secured for rotation with the shaft while being axially movable thereon, the first and second jaw gears being further arranged for meshing engagement with each other, the improvement comprising gear teeth formed upon the first and second jaw gears with a negative overlapping pressure angle to maintain engagement between the jaw gears, the teeth being spaced apart sufficiently to permit selective engagement and disengagement between the jaw gears, and a disconnect clutch and associated brake unit, the disconnect clutch comprising a hydraulically responsive actuating piston slidably arranged within a bore internally formed by the elongated shaft and coupled with the second jaw gear, the brake unit being hydraulically actuated simultaneously with the disconnect clutch actuating piston and comprising detent means movably arranged within the elongated drive shaft for engagement with the first jaw gear to selectively secure it against axial movement and thereby facilitate disengagement between the two jaw gears by the disconnect clutch.

2. The winch of claim 1 wherein the brake unit comprises a pair of detent pins arranged in opposed relation within a bore diametrically penetrating the drive shaft in axial alignment with an annular groove formed by the first jaw gear, the bore for the detent pins being in communication with an actuating chamber for the disconnect clutch.

3. The winch of claim 2 further comprising a spring arranged between the detent pins, the spring applying a light force tending to urge the pins outwardly into engagement with the first jaw gear.

4. The winch of claim 2 further comprising a spring interconnected between the two detent pins and tending to urge the detent pins axially inwardly toward each other and out of engagement with the first jaw gear, actuating fluid from the disconnect clutch overcoming the spring and urging the detent pin outwardly to prevent axial movement of the first jaw gear.

5. In a winch of the type having a rotatable cable drum and including a power input means, an elongated drive shaft, a clutch means providing a selective coupling between the power input means and the elongated drive shaft, a first clutch member rotatably mounted on the drive shaft and operatively coupled in driving relation with the rotatable cable drum, a second clutch member secured for rotation with the shaft while being axially movable thereon, the first and second clutch members having facing jaw-type gears suitable for meshing engagement with each other, the improvement comprising a disconnect clutch actuating means and associated brake unit internally arranged within the elongated drive shaft, the disconnect clutch actuating means comprising a hydraulically responsive piston axially movable within a chamber formed by the elongated drive shaft and coupled with the second clutch member to control its axial position and thereby regulate engagement and disengagement between the first and second clutch members, the associated brake unit comprising a pair of detent pins arranged in opposed relation within a bore diameterically penetrating the elongated shaft and being in communication with an actuating chamber for the disconnect clutch piston, the detent pins being urged outwardly into engagement with an annular groove formed by the first clutch member in response to actuating pressure within the actuating chamber for the disconnect clutch piston to selectively limit freewheeling rotation of the first clutch member and the rotatable cable drum.

* * * * *